(12) United States Patent
Herrity

(10) Patent No.: US 8,705,633 B2
(45) Date of Patent: Apr. 22, 2014

(54) METHOD AND APPARATUS FOR TRANSPORTING AN 8B/10B CODED VIDEO STREAM ACROSS A 64B/66B CODED LINK

(75) Inventor: Kenneth R. Herrity, Milpitas, CA (US)

(73) Assignee: Omron Management Center of America, Inc., Schaumburg, IL (US)

( * ) Notice: Subject to any disclaimer, the term of this patent is extended or adjusted under 35 U.S.C. 154(b) by 250 days.

(21) Appl. No.: 13/136,251

(22) Filed: Jul. 27, 2011

(65) Prior Publication Data

US 2012/0027099 A1     Feb. 2, 2012

Related U.S. Application Data

(60) Provisional application No. 61/400,444, filed on Jul. 28, 2010.

(51) Int. Cl.
    *H04N 7/12*         (2006.01)
    *H04B 14/04*      (2006.01)
    *G06F 11/00*      (2006.01)

(52) U.S. Cl.
    USPC .................. 375/240.25; 375/253; 714/707

(58) Field of Classification Search
    USPC ..................... 375/240, 253; 714/707
    See application file for complete search history.

(56) References Cited

U.S. PATENT DOCUMENTS

2006/0256875 A1*   11/2006   McClellan ............... 375/242

* cited by examiner

*Primary Examiner* — Dave Czekaj
*Assistant Examiner* — Tsion B Owens
(74) *Attorney, Agent, or Firm* — Murphy, Bilak & Homiller, PLLC

(57) ABSTRACT

A video transport system is provided for transporting as 8B/10B coded video stream across a 64B/66B coded link, wherein forward error correction is provided without the overhead of the prior art. The system also provides a system with the ability to recover 64B/66B Encoded blocks that have corrupt Sync bits.

7 Claims, 11 Drawing Sheets

*Mixed 4-Byte Block*

This Control Block transports 4 bytes of mixed Data Bytes and Mapped Control Bytes. The "Map" byte defines the how bytes 3-6 should be interpreted (Data Byte or Mapped Control Byte).

| Sync | Byte 0 | Byte 1 | Byte 2 | Byte 3 | Byte 4 | Byte 5 | Byte 6 | Byte 7 |
|---|---|---|---|---|---|---|---|---|
| 10 | Block Type (0x4) | Block Type Verification (0xf) | MAP | Data/Cntl 0 | Data/Cntl 1 | Data/Cntl 2 | Data/Cntl 3 | Info Cksm |

*Mixed 4-Byte Control Block*

Block Type (Byte 0: 4B/8B Encoded; See Table 6)

Block Type Verification (Byte 1; 4B/8B Encoded; See Table 6)

MAP Byte (Byte 2; 4B/8B Encoded; See Table 6)

MAP [3] =   Byte 6 Data/Control (1 = Data; 0 = Control)
     MAP [2] =   Byte 5 Data/Control (1 = Data; 0 = Control)
     MAP [1] =   Byte 4 Data/Control (1 = Data; 0 = Control)
     MAP [0] =   Byte 3 Data/Control (1 = Data; 0 = Control)

Info Cksm Byte (Byte 7; 4B/8B Encoded; See Table 6)

The "Info Cksm" Byte is used to distinguish between 64B/66B Control and Data Blocks when the Sync bits are corrupted. The "Info Cksm" is computed as follows:

$$\text{InfoCksm} = \text{Mod}_{16} \{0xF - (\text{BlkType} + \text{BlkTypeVerification} + \text{MAP})\}$$

Fig. 1 - HDMI Video Guard Band Coding
*See HDMI v1.3a, Sec. 5.2.2.1*

| Notation | 10B Input | Mapped Control Byte Output Encoding |
|---|---|---|
| VGB_0_2 | 0b101001100 | 0xb4 |
| VGB_1 | 0b010011001 | 0x55 |

Fig. 2 - HDMI Data Island Guard Band Coding
*See HDMI v1.3a, Section 5.2.3.3*

| Notation | 10B Input | Mapped Control Byte Output Encoding |
|---|---|---|
| DGB | 0b0100110011 | 0x55 |

Fig. 3 - HDMI Control Period Coding
*See HDMI v1.3a, Section 5.4.2*

| Notation | 10B Input | Mapped Control Byte Output Encoding |
|---|---|---|
| CTL_PRD_D[1:0]= 0b00 | 0b1101010100 | 0x78 |
| CTL_PRD_D[1:0]= 0b01 | 0b0010101011 | 0x99 |
| CTL_PRD_D[1:0]= 0b10 | 0b0010101100 | 0xaa |
| CTL_PRD_D[1:0]= 0b10 | 0b0101010011 | 0x4b |

Fig. 4 – HDMI TMDS Error Reduction Coding (TERC4)

See HDMI V1.3a, Section 5.4.3

| Notation | 10B Input | Mapped Control Byte Output Encoding |
|---|---|---|
| TERC4_D[3:0] = 0x0 | 0b1010011100 | 0x00 |
| TERC4_D[3:0] = 0x1 | 0b1001100011 | 0xe1 |
| TERC4_D[3:0] = 0x2 | 0b1011100100 | 0xd2 |
| TERC4_D[3:0] = 0x3 | 0b1011100010 | 0x33 |
| TERC4_D[3:0] = 0x4 | 0b0101110001 | 0xb4 |
| TERC4_D[3:0] = 0x5 | 0b0100011110 | 0x55 |
| TERC4_D[3:0] = 0x6 | 0b0110001110 | 0x66 |
| TERC4_D[3:0] = 0x7 | 0b0100111100 | 0x87 |
| TERC4_D[3:0] = 0x8 | 0b1011001100 | 0x78 |
| TERC4_D[3:0] = 0x9 | 0b0100111001 | 0x99 |
| TERC4_D[3:0] = 0xa | 0b0110011100 | 0xaa |
| TERC4_D[3:0] = 0xb | 0b1011000110 | 0x4b |
| TERC4_D[3:0] = 0xc | 0b1010001110 | 0xcc |
| TERC4_D[3:0] = 0xd | 0b1001110001 | 0x2d |
| TERC4_D[3:0] = 0xe | 0b0101100011 | 0x1e |
| TERC4_D[3:0] = 0xf | 0b1011000011 | 0xff |

Fig. 5 – DisplayPort Control Codes

See DisplayPort v1.1, Sections 2.2.1.1, 2.2.1.2 and 3.5.1.2 (Table 3-8)

| 8B/10B Code Group | Notation | 10B Input | Mapped Control Byte Output Encoding |
|---|---|---|---|
| K28.5 | /BS/ | IEEE Standard | 0x78 |
| K28.7 | /BE/ | IEEE Standard | 0x87 |
| K30.7 | /FS/ | IEEE Standard | 0xcc |
| K23.7 | /FE/ | IEEE Standard | 0x99 |
| K28.2 | /SS/ | IEEE Standard | 0x33 |
| K29.7 | /SE/ | IEEE Standard | 0xb4 |
| K28.0 | /SR/ | IEEE Standard | 0x1e |
| K28.1 | /CPBS/ or /CP/ | IEEE Standard | 0x2d |
| K28.3 | /CPSR/ or /BF/ | IEEE Standard | 0x66 |

Fig. 6 - 4B/8B Information Code

The 4B/8B Code is used to encode "Information Bytes" in 64B/66B Control Blocks. "Information Bytes" are any bytes in a Control Block that are not used to transport "Stream Data" or "Stream Control". "Information Bytes" are used to encode information about the stream. Each "Information Byte" represents one nibble (4-bit value) of information about the stream.

| Nibble Input | Information Byte Output Encoding |
|---|---|
| 0x0 | 0x00 |
| 0x1 | 0xe1 |
| 0x2 | 0xd2 |
| 0x3 | 0x33 |
| 0x4 | 0xb4 |
| 0x5 | 0x55 |
| 0x6 | 0x66 |
| 0x7 | 0x87 |
| 0x8 | 0x78 |
| 0x9 | 0x99 |
| 0xa | 0xaa |
| 0xb | 0x4b |
| 0xc | 0xcc |
| 0xd | 0x2d |
| 0xe | 0x1e |
| 0xf | 0xff |

Fig. 7 - Stream Data Block

This Data Block is exclusively used to transport Data Bytes over the 64B/66B link.

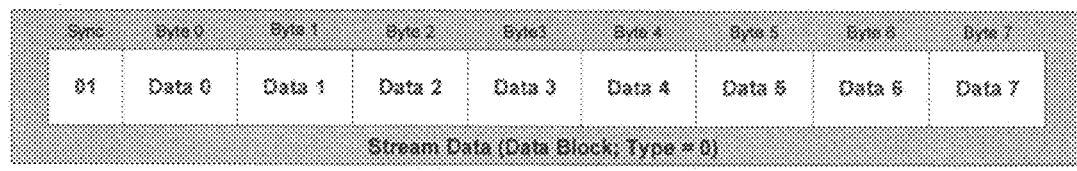

Fig. 8 - Stream Control Block

This Data Block is exclusively used to transport Mapped Control Bytes over the 64B/66B link. Mapped Control Bytes are created by decoding Video Control Symbols from the Video Source and then Mapping those Control Symbols in to their corresponding Mapped Control Byte Codes (see Tables 1 – 6 above).

| Sync | Byte 0 | Byte 1 | Byte 2 | Byte 3 | Byte 4 | Byte 5 | Byte 6 | Byte 7 |
|---|---|---|---|---|---|---|---|---|
| 01 | Control 0 | Control 1 | Control 2 | Control 3 | Control 4 | Control 5 | Control 6 | Control 7 |
| Stream Control (Data Block, Type = 1) | | | | | | | | |

Fig. 9 - Split Aligned Block

This Data Block is used to transport alternating Mapped Control Bytes and Data Bytes where Byte 0 is a Mapped Control Byte.

| Sync | Byte 0 | Byte 1 | Byte 2 | Byte 3 | Byte 4 | Byte 5 | Byte 6 | Byte 7 |
|---|---|---|---|---|---|---|---|---|
| 01 | Control 0 | Data 1 | Control 2 | Data 3 | Control 4 | Data 5 | Control 6 | Data 7 |
| Split Aligned (Data Block, Type = 2) | | | | | | | | |

Fig. 10 - Split Unaligned Block

This Data Block is also used to transport alternating Mapped Control Bytes and Data Bytes. However, the "Split Unaligned Block" begins with a Data Byte in Byte 0.

| Sync | Byte 0 | Byte 1 | Byte 2 | Byte 3 | Byte 4 | Byte 5 | Byte 6 | Byte 7 |
|---|---|---|---|---|---|---|---|---|
| 01 | Data 0 | Control 1 | Data 2 | Control 3 | Data 4 | Control 5 | Data 6 | Control 7 |
| Split Unaligned (Data Block, Type = 3) | | | | | | | | |

Fig. 11 - Idle Data Block

This Data Block is used to transport "Idle Data" bytes. "Idle Data" bytes are used to keep the 64B/66B Link active when there are no Data Bytes or Mapped Control Bytes that need to be transported. "Idle Data" bytes are never presented to the Sink.

"Idle Data" bytes are not encoded. Thus, these bytes may be used to transport test patterns that can be used for 64B/66B link performance monitoring.

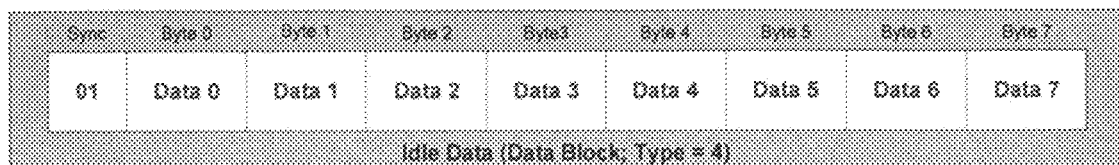

Fig. 12 - Mixed 4-Byte Block

This Control Block transports 4 bytes of mixed Data Bytes and Mapped Control Bytes. The "Map" byte defines the how bytes 3-6 should be interpreted (Data Byte or Mapped Control Byte).

| Sync | Byte 0 | Byte 1 | Byte 2 | Byte 3 | Byte 4 | Byte 5 | Byte 6 | Byte 7 |
|------|--------|--------|--------|--------|--------|--------|--------|--------|
| 10 | Block Type (0x8) | Block Type Verification (0xf) | MAP | Data/Cntl 0 | Data/Cntl 1 | Data/Cntl 2 | Data/Cntl 3 | Info Cksm |

Mixed 4-Byte (Control Block)

Block Type (Byte 0: 4B/8B Encoded; See Table 6)

Block Type Verification (Byte 1; 4B/8B Encoded; See Table 6)

MAP Byte (Byte 2; 4B/8B Encoded; See Table 6)

MAP [3] = Byte 6 Data/Control (1 = Data; 0 = Control)
    MAP [2] = Byte 5 Data/Control (1 = Data; 0 = Control)
    MAP [1] = Byte 4 Data/Control (1 = Data; 0 = Control)
    MAP [0] = Byte 3 Data/Control (1 = Data; 0 = Control)

Info Cksm Byte (Byte 7; 4B/8B Encoded; See Table 6)

The "Info Cksm" Byte is used to distinguish between 64B/66B Control and Data Blocks when the Sync bits are corrupted. The "Info Cksm" is computed as follows:

$$\text{InfoCksm} = \text{Mod}_{16}\ (0xF - (\text{BlkType} + \text{BlkTypeVerification} + \text{MAP}))$$

Fig. 13 - Mixed 3-Byte Block

This Control Block transports 3 bytes of mixed Data Bytes and Mapped Control Bytes.

| Sync | Byte 0 | Byte 1 | Byte 2 | Byte 3 | Byte 4 | Byte 5 | Byte 6 | Byte 7 |
|---|---|---|---|---|---|---|---|---|
| 10 | Block Type (0x3) | Block Type Verification (0x0) | MAP | Data/Cntl 0 | Data/Cntl 1 | Data/Cntl 2 | Fill (0xb) | Info Cksm |

Mixed 3-Byte (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

>   MAP[3] = Reserved (Always 0)
>   MAP[2] = Byte 5 Data/Control (1 = Data; 0 = Control)
>   MAP[1] = Byte 4 Data/Control (1 = Data; 0 = Control)
>   MAP[0] = Byte 3 Data/Control (1 = Data; 0 = Control)

Fill Byte (Byte 6; 4B/8B Encoded; See Table 6)

Info Cksm Byte (Byte 7; 4B/8B Encoded; See Table 6)

>   InfoCksm = $Mod_{16}$ {0xF – (BlkType + BlkTypeVerification + MAP)}

Fig. 14 - Mixed 2-Byte Block

This Control Block transports 2 bytes of mixed Data Bytes and Mapped Control Bytes.

| Sync | Byte 0 | Byte 1 | Byte 2 | Byte 3 | Byte 4 | Byte 5 | Byte 6 | Byte 7 |
|------|--------|--------|--------|--------|--------|--------|--------|--------|
| 10 | Block Type (0x2) | Block Type Verification (0x1) | MAP | Data/Cntl 0 | Data/Cntl 1 | Fill (0xb) | Fill (0xb) | Info Cksm |

Mixed 2-Byte (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

> MAP [3] = Reserved (Always 0)
> MAP [2] = Reserved (Always 0)
> MAP [1] = Byte 4 Data/Control (1 = Data; 0 = Control)
> MAP [0] = Byte 3 Data/Control (1 = Data; 0 = Control)

Fill Bytes (Bytes 5-6; 4B/8B Encoded; See Table 6)

Info Cksm Byte (Byte 7; 4B/8B Encoded; See Table 6)

> InfoCksm = $Mod_{16}$ {0xF − (BlkType + BlkTypeVerification + MAP)}

Fig. 15 - Mixed 1-Byte Block

This Control Block transports 1 Data Byte or Mapped Control Byte.

| Sync | Byte 0 | Byte 1 | Byte 2 | Byte 3 | Byte 4 | Byte 5 | Byte 6 | Byte 7 |
|------|--------|--------|--------|--------|--------|--------|--------|--------|
| 10 | Block Type (0x1) | Block Type Verification (0x2) | MAP | Data/Cntl 0 | Fill (0xb) | Fill (0xb) | Fill (0xb) | Info Cksm |

Mixed 1-Byte (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] = Reserved (Always 0)
    MAP [2] = Reserved (Always 0)
    MAP [1] = Reserved (Always 0)
    MAP [0] = Byte 3 Data/Control (1 = Data; 0 = Control)

Fill Bytes (Bytes 4-6; 4B/8B Encoded; See Table 6)

Info Cksm Byte (Byte 7; 4B/8B Encoded; See Table 6)

InfoCksm = $Mod_{16}$ {0xF − (BlkType + BlkTypeVerification + MAP)}

Fig. 16 - Set Default Data Block

This Control Block transports 3 bytes of mixed Data Bytes and Mapped Control Bytes in the same manner as the "Mixed 3-Byte Block" (Figure 7). However, this Block also contains a "Type" byte that defines how subsequent Data Blocks should be interpreted when they are received.

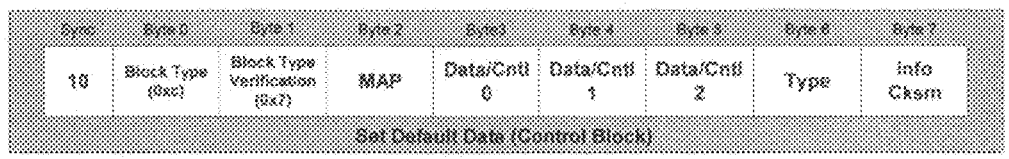

Set Default Data (Control Block)

Block Type (Byte 0; 4B/8B Encoded; See Table 6)

Block Type Verification (Byte 1; 4B/8B Encoded; See Table 6)

MAP Byte (Byte 2; 4B/8B Encoded; See Table 6)

MAP [3] = Reserved (Always 0)
    MAP [2] = Byte 5 Data/Control (1 = Data; 0 = Control)
    MAP [1] = Byte 4 Data/Control (1 = Data; 0 = Control)
    MAP [0] = Byte 3 Data/Control (1 = Data; 0 = Control)

Type (Byte 6; 4B/8B Encoded; See Table 6)

0 = Subsequent Data Blocks are "Stream Data" (Figure 1)
    1 = Subsequent Data Blocks are "Stream Control" (Figure 2)
    2 = Subsequent Data Blocks are "Split Aligned" (Figure 3)
    3 = Subsequent Data Blocks are "Split Unaligned" (Figure 4)
    4 = Subsequent Data Blocks are "Idle Data" (Figure 5)

Info Cksm Byte (Byte 7; 4B/8B Encoded; See Table 6)

InfoCksm = $Mod_{16}$ {0xF − (BlkType + BlkTypeVerification + MAP)}

*Fig. 17 Schematic Representation of the environment of the invention*

METHOD AND APPARATUS FOR TRANSPORTING AN 8B/10B CODED VIDEO STREAM ACROSS A 64B/66B CODED LINK

CROSS REFERENCE TO RELATED APPLICATION

This application claims the benefit of and priority from U.S. provisional application Ser. No. 61/400,444 filed Jul. 28, 2010

BACKGROUND

A video system can tolerate a relatively high pixel error rate without noticeably degrading the displayed video image. Pixel errors will manifest as sparkles that will be mostly un-noticeable in the displayed image.

However, video control errors may corrupt the entire displayed frame and may also corrupt the output audio. Thus, even a relatively small number of errors can result in noticeable image flickering and audible bursts of noise. Consequently, video control symbol errors must be prevented while video data symbol errors may be tolerated.

Most forward error correction schemes focus on protecting the entire data stream. This approach adds between 7% and 10% overhead to the data stream and requires logic that is large and complex.

In 64B/66B, prior art forward error control is inherently incapable of protecting sync bits, i.e. the prior art is unable to correct sync bits. While the prior art may be able to detect that a sync bit error occurred, it will not be able to determine how to correct the error. This failure will cause the entire 66B coded word to be lost or corrupted.

The disclosed invention provides effective protection for video control without introducing either the overhead or complexity associated with traditional forward error correction schemes.

BRIEF SUMMARY OF INVENTION

As shown and described below, the present invention increases the efficiency of the link by providing forward error correction without introducing the overhead or complexity of prior art forward error correction schemes such as Reed-Solomon.

The present invention also provides, for the first time known to applicant, a system having the ability to recover 64B/66B Encoded Blocks that have corrupt "Sync" bits.

Prior art for video transport over 64B/66B coded links, such as RTP (Real Time Transport Protocol) involve packing the video information into RTP Data packets and RTCP Control Packets and then transporting those packets across a network using the Internet Protocols defined by the Internet Engineering Task Force (IETF). These RTP and TRCP packets must be unpacked at the receiver in order to recreate the original video stream. RTP does not teach how to transport 8B/10B Video Data at the byte/symbol level without the complexity and overhead of segmenting the Video stream in to Packets, inserting packet headers for RTP and any other Routing and Link Layer protocol used for physical packet transport, and then stripping those packet headers from the RTP packets at the receiver so that the original Video Stream can be reassembled from the transmitted packet segments.

Prior art for transporting standard Ethernet 8B/10B symbols over a 64B/66B Link (such as IEEE Standard 802.3-2005 Section 49) does not teach how to transport 8B/10B video symbols that do not comply with the Ethernet Standard (such as 8B/10B symbols disclosed in the "High Definition Multimedia Interface Specification" Version 1.3a, Section 5). This prior art also does not teach how to protect the 8B/10B coded Video Control information without adding the 7% to 10% overhead associated with the traditional FEC scheme.

The present invention provides, for the first time known to applicant, a system having the ability to transport 8B/10B coded video streams over a 64B/66B link such that the 8B/10B Video Streams do not have to be packed or recoded using a Transport Layer Protocol (such as RTP) and such that non-standard 8B/10B Video Symbols may be directly transported on the 64B/66B link while retaining the ability to detect and correct all Video Control symbol errors.

BRIEF DESCRIPTION OF THE DRAWINGS

FIG. 1 HDMI Video Guard Band Coding
FIG. 2 HDMI Data Island Guard Band Coding
FIG. 3 HDMI Control Period Coding
FIG. 4 HDMI TMDS Error Reduction Coding (TERC4)
FIG. 5 Display Port Control Codes
FIG. 6 4B/8B information Code
FIG. 7 Stream Data Block (64B/66B Data Block)
FIG. 8 Stream Control Block (64B/66B Data Block)
FIG. 9 Split Aligned Block (64B/66B Data Block)
FIG. 10 Split Unaligned Block (64B/66B Data Block)
FIG. 11 Idle Data Block (64B/66B Data Block)
FIG. 12 Mixed 4-Byte Block (64B/66B Control Block)
FIG. 13 Mixed 3-Byte Block (64B/66B Control Block)
FIG. 14 Mixed 2-Byte Block (64B/66B Control Block)
FIG. 15 Mixed 1-Byte Block (64B/66B Control Block)
FIG. 16 Set Default data Block (64B/66B Control Block)
FIG. 17 A schematic representation of the environment of the invention

DETAILED DESCRIPTION OF THE DRAWINGS

The invention protects the 8B/10B control symbols in a video stream as follows:

1. A Video Source sends an 8B/10B input video stream to a Transmitter according to this invention.
2. The Transmitter decodes the 8B/10B input video stream such that each 10B symbol is represented as a byte with an associated flag that indicates whether or not the decoded 10B symbol was a Control Byte or Data Byte.
3. The Transmitter translates the Control Bytes into unique mapped Control Bytes that have a Hamming distance of 3 or more. This allows for single bit error correction on each Mapped Control Byte. This is possible because the number of unique Control Bytes in a video stream is small. See FIGS. 1-5 for examples of how Video Control Symbols can be translated into protected Mapped Control Bytes.
4. The Transmitter packs the decoded Data Bytes and the Mapped Control Bytes (in the order received) into an appropriate 64B/66B Data Block "Type". The transmitter selects the Data Block "Type" based on the mix of Data Bytes and mapped Control Bytes that need to be transmitted. See FIGS. 7-10 for some examples of pre-defined Data Block "Types".
5. The Transmitter uses a 64B/66B Control Block (see FIG. 16; "Set Default Data Block") to inform the Receiver which Data Block "Type" to expect. The Transmitter only needs to select a new Data Block Type when the mix of Data Bytes and Mapped Control Bytes changes.
6. The Transmitter sends "Idle Data" Data Blocks (see FIG. 11) to the Receiver when the Transmitter has no new Video Data from the Video Source. The Receiver does not decode or forward Idle Data to the Video Sink.

7. The Transmitter packs Data Bytes and Mapped Control Bytes into an appropriate 64B/66B Control Block (instead of a Data Block) when there are less than 8 Video Bytes that need to be transmitted or when the mix of Data Bytes and Mapped Control Bytes does not match any of the pre-defined Data Block "Types".

8. In order to achieve maximum 64B/66B efficiency, the Transmitter uses a 64B/66B Data Block whenever possible and only uses a 64B/66B Control Block when necessary.

9. The Transmitter places 4B/8B Information Bytes (see FIG. 6) in Control Blocks to identify the Control Block, map the location of Data/Control Bytes, select the next Data Block "Type" and encode redundant information (used to identify Control Blocks when the Sync Bits are corrupt).

10. The Transmitter packs redundant information in the 64B/66B Control Blocks to make it possible for the Receiver to reliably distinguish between 64B/66B Control and Data Blocks when the 64B/66B Sync bits are corrupted. In the event of Sync Bit corruption (Sync=0b00 or 0b11), the Receiver checks the block format and verifies the redundant information. If the block format and redundant information are consistent with a valid Control Block, then the Receiver interprets the 64B/66B Block with corrupt Sync bits as a Control Block. Otherwise, the Receiver interprets the 64B/66B Block as a Data Block. See FIGS. 12-16 for examples of Control Blocks with redundant information.

11. The Transmitter transmits the 64B/66B blocks to the Receiver

12. The Receiver receives the 64B/66B stream and then decodes the Control Blocks and Data Blocks disclosed above to correct any errors in the Mapped Control Bytes and then recreates the original 8B/10B stream with both the same order and number of symbols that were presented to the Transmitter.

The receiver then sends the reconstructed 8B/10B stream to the Video Sink.

As used herein:

HDMI is an acronym for "High Definition Multi-Media Interface"

TMDS is an acronym for "Transition Minimized Differential Signaling"

TERC4 is an acronym for "TMDS Error Reduction Coding 4 bit"

FIG. 17 is a schematic representation of the environment of the invention, illustrating the relationship of a video source, transmitter, receiver and video sink relative to each other.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

The invention claimed is:

1. A method for transporting an 8B/10B coded video stream from a transmitter across a 64B/66B coded link to a receiver comprising the steps:

receiving an 8B/10B input video stream at said transmitter, decoding said 8B/10B input video stream by said transmitter such that each 10B symbol is represented as a byte with an associated flag indicating whether each said symbol was a control byte or a decoded data byte;

translating each of said control bytes by said transmitter into a unique mapped control byte having a Hamming distance of 3 or more and thereby facilitating single bit error correction on each of said mapped control bytes, packing said decoded data bytes and said mapped control bytes into a series of 64B/66B data blocks, wherein each 64B/66B data block is packed according to a selected mix of control and data bytes, as selected by the transmitter from among several different predefined mixes; and sending a 64B/66B control block to inform said receiver when the selected mix of control and data bytes changes in the 64B/66B data blocks outgoing from the transmitter.

2. The method of claim 1 further comprising using one of the defined mixes of control and data bytes and sending corresponding 64B/66B data blocks whenever possible with respect to the decoded control and data bytes, and only sending a 64B/66B control block when necessary.

3. The method of claim 1 further the 8B/10B input video stream is sent by a video source and further comprising sending idle data blocks from said transmitter to said receiver when said transmitter has no new video data from said video source.

4. The method of claim 1 comprising the further step:

packing data bytes and mapped control bytes by said transmitter into an appropriate 64B/66B control block when there are less than 8 video bytes that need to be transmitted.

5. The method of claim 1 wherein data block types defining the different mixes of control and data bytes used to pack the 64B/66B data blocks are predefined, and comprising the further step:

packing data bytes and mapped control bytes by said transmitter into an appropriate 64B/66B control block when the mix of data bytes and mapped control bytes does not match any of said predefined data block types.

6. A method for transporting an 8B/10B coded video stream from a transmitter across a 64B/66B coded link to a receiver comprising the steps:

receiving an 8B/10B input video stream at the transmitter and decoding the 8B/10B input video stream to obtain a stream of decoded control bytes and decoded data bytes;

mapping the decoded control bytes into mapped control bytes having a minimum hamming distance, and forming an outgoing stream of decoded data bytes and mapped control bytes for transmission to the receiver over the 64B/66B coded link;

selecting a first Data Block Type and sending a first 64B/66B control block to the receiver, to indicate the selection of the first Data Block Type, where the first Data Block Type is one among a plurality of predefined Data Block Types and where each Data Block Type defines a mix of mapped control bytes and decoded data bytes to be packed by the transmitter into any given outgoing 64B/66B data block transmitted according to that Data Block Type;

packing first ones of the mapped control bytes and decoded data bytes into one or more first 64B/66B data blocks, according to the mixed defined by the first Data Block Type, and sending the one or more first 64B/66B data blocks to the receiver;

selecting a second Data Block Type, different from the first Data Block Type;

sending a second 64B/66B control block to the receiver, to indicate the change from the first Data Block Type to the second Data Block Type; and packing second ones of the mapped control bytes and decoded data bytes into one or more second 64B/66B data blocks, according to the mix defined by the second Data Block Type, and sending the one or more second 64B/66B data blocks to the receiver.

7. The method of claim 6, further comprising deciding to change from the first Data Block Type to the Second Data Block Type responsive to a change in the incoming mix of control bytes and data bytes in the 8B/10B input video stream.

* * * * *